UNITED STATES PATENT OFFICE.

REMO C. ZANON, OF MODESTO, CALIFORNIA, ASSIGNOR OF ONE-HALF TO JOHN J. FERLIN, OF MODESTO, CALIFORNIA.

AUTOMATIC SAFETY-CLUTCH.

1,391,601.   Specification of Letters Patent.   Patented Sept. 20, 1921.

Application filed December 8, 1920. Serial No. 429,264.

*To all whom it may concern:*

Be it known that I, REMO C. ZANON, a citizen of the United States, residing at Modesto, county of Stanislaus, State of California, have invented certain new and useful Improvements in Automatic Safety-Clutches; and I do declare the following to be a full, clear, and exact description of the same, reference being had to the accompanying drawings and to the characters of reference marked thereon, which form a part of this application.

This invention relates to improvements in automatic clutches, being particularly adapted and intended to be interposed in the driving mechanism of a power driven mower sickle-bar, driven in the same or a similar manner as that shown in my copending application Serial No. 407,248, filed August 31st, 1920. The clutch structure may however be applied to any mechanism in which the driven member is apt to encounter obstructions which tend to either "stall" it or cause the breakage of some part if the power is not instantly disconnected.

The principal object of my invention therefore is to provide a device of this character which will transmit power to the driven member up to a predetermined amount of resistance and will automatically disengage the power from the driven member when the resistance to the operation of the latter exceeds such amount, and when this resistance is removed or again becomes normal, the clutch is again automatically engaged and the power transmitted once more.

Such a clutch is a necessity for the proper operation of a mower sickle-bar operated by power, since in the progress of the mower across a field, various obstacles beyond the power of the sickle to cut are very apt to be encountered, which, if no way were provided to allow for instant disconnecting of the power, would result in breakage of some part or another, or stalling of the engine.

This clutch may also be successfully used in machine tools of various kinds such as drill presses and the like, where the drills or cutting tools are apt to strike hard spots in the material being operated on, causing breakage of either the tool or the piece being worked.

Another object is to provide means for regulating the amount of power which the driving member may transmit to the driven member without the latter slipping or becoming disengaged.

A further object of the invention is to produce a simple and inexpensive device and yet one which will be exceedingly effective for the purposes which it is designed.

These objects I accomplish by means of such structure and relative arrangement of parts as will fully appear by a perusal of the following specification and claims.

In the drawings similar characters of reference indicate corresponding parts in the several views.

Figure 1:
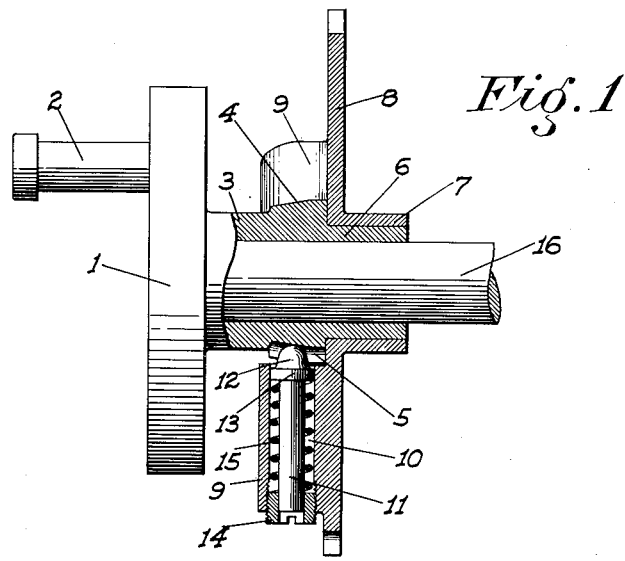
Figure 1 is a sectional elevation of the assembled clutch.
Figure 2:
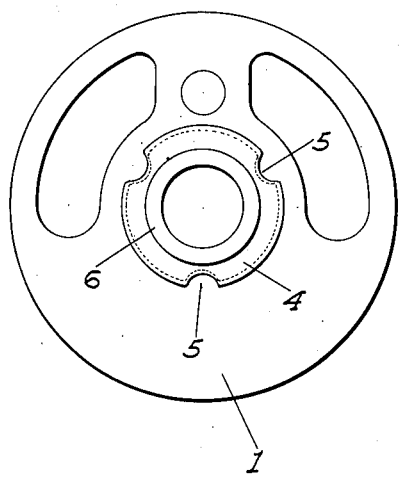
Fig. 2 is a face view of the driven member.
Figure 3:
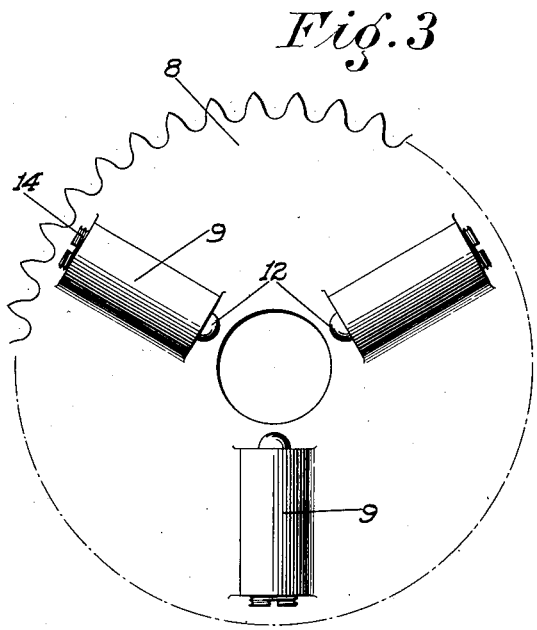
Fig. 3 is a similar view of the driving member.

Referring now more particularly to the characters of reference on the drawings, the numeral 1 denotes the driven member, which may be a gear, pulley or other piece, but is here shown to represent the pitman operating crank of a mower, having a crank pin 2 to which the pitman is connected.

On the side opposite the pin the member 1 is formed with a hub 3, having an outwardly tapering portion 4 provided with radially positioned grooves 5, similarly tapered.

Beyond this tapered portion the hub is reduced to form a bearing 6 for the hub 7 of a sprocket wheel 8 or other driving member which is connected directly to the source of power.

Formed with the member 8, and positioned radially thereon, and overhanging the tapered portion 4 of the hub are bosses 9, bored as at 10 to receive pins 11 provided with substantially semi-spherical heads or knobs 12 adapted to fit into the grooves 5.

At the inner end of the heads are shoulders 13 slidable in the bore 10, the outer end of the pins being slidable through adjustment nuts 14 screwed into the outer ends of the bosses 9, springs 15 being interposed between the nuts and the shoulders so as to force the heads 12 into the grooves, the pressure of contact being regulated by adjustment of the nuts 14.

The entire structure is supported by a shaft 16 fixed to the member 1 and projecting through the hub and therebeyond to a suitable bearing (not shown).

In operation, the members 1 and 8 turn as one until the resistance acting on the member 1 exceeds the tension of the springs 15, when the heads 12 will withdraw from the grooves and will ride around the plain circular portion of the member 4. Of course the heads will seat in the successive grooves with the continued rotation of the driving member $8^k$, but as long as the excessive resistance remains, they will immediately withdraw from the grooves again, leaving the driven member stationary.

The purpose of the taper of the grooves and member 4 is to cause the driving and driven members to be pulled into and kept in their proper alined positions without the use of thrust bearings at the outer ends of the hubs.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful, and desire to secure by Letters Patent is:—

1. An automatic safety clutch comprising a driven member, a hub thereon, a driving member mounted on the hub, the latter being provided with longitudinal grooves beyond the plane of the driving member, pins mounted to the driving member radially thereof and having heads normally seated in the grooves and means for regulating the force of engagement of such heads with the grooves and said hub and grooves tapering outwardly away from the driven member, whereby the driving and driven members are automatically held in their proper spaced relation.

2. An automatic safety clutch comprising a driven member, a driving member turnably mounted in connection therewith, one of said members being provided with grooves on its circumference parallel to the axis thereof, and spring-pressed pins mounted on the other member and normally seating in the grooves, the grooves and the circumferential area of the member in which said grooves are cut tapering in a direction to automatically maintain the driving and driven members in their proper spaced relation.

In testimony whereof I affix my signature.

REMO C. ZANON.